W. R. CLARK.
Railroad Rail-Joints.
No. 136,307. Patented Feb. 25, 1873.
Fig. I.
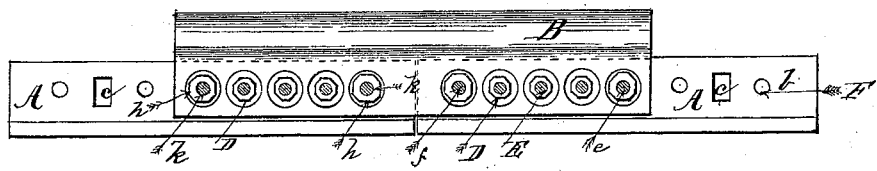
Fig. II.
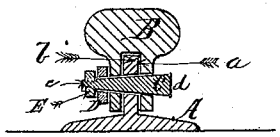
Fig. III.
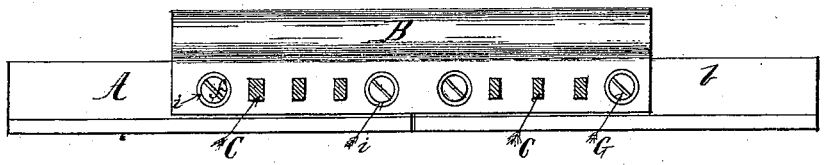
Fig. IV.
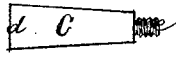
Witnesses:
Richard Gerner
Franklin Barrett
Inventor:
William R. Clark
per Henry Gerner Att

UNITED STATES PATENT OFFICE.

WILLIAM R. CLARK, OF THELLERTOWN, PENNSYLVANIA.

IMPROVEMENT IN RAILROAD-RAIL JOINTS.

Specification forming part of Letters Patent No. 136,307, dated February 25, 1873.

*To all whom it may concern:*

Be it known that I, WILLIAM R. CLARK, of Thellertown, county of Northampton, State of Pennsylvania, have invented certain Improvements in Railroad Rails, of which the following is a specification:

The object of my invention is to fasten the loose top part of a rail to the lower or spiked part in a more substantial and perfect manner than heretofore done.

It is evident that the top part is exposed to the wear and tear, and it is therefore found desirable to make the upper and lower part separate and make the upper part of a better and more lasting metal—for instance, of steel. To make the whole rail of steel is, therefore, unnecessary, as the rails made in two parts are both cheaper and more desirable in all respects. The difficulty in fastening the upper rail to the lower in a substantial and easily adjustable manner has, however, prevented the introduction of such rails. The upper part is generally bolted to the lower. By the jolting and working of the trains the holes in the rails become enlarged, and the bolts are thus unable to hold the upper part firmly to the lower, and the rail becomes speedily disabled. By making square holes in the rails and introducing a tapered key with head at one end and thread and nut at the other the so constructed key acts as a wedge, and, by simply tightening the nuts from time to time, the parts of the rails are always held firmly together.

In order to describe my invention more fully I refer to the accompanying drawing forming a part of this specification.

Figure I is a side view of a joined rail embodying my invention, showing the keys, washers, nuts, and the holes in the rails. Fig. II is a vertical cut section through line $x\ x$, Fig. I. Fig. III is a side view of a joined rail embodying my invention, showing the heads of the keys. Fig. IV is an enlarged detached plan view of one of the keys.

A is the lower part of a rail spiked or held to the sleepers in the ordinary manner. B is the top part of the rail, which is grooved at $a$ and made to fit over the top $b$ of A. Holes are cut into the top $b$ and through the grooved part $a$ at certain distances apart, so that the holes in $b$ correspond with the holes in $a$. Some few holes are made round, but the majority are made square, tapering from one side of the rail to the other. Into these tapering square holes $c\ c$ are placed the tapering square keys C C, which are made with a head, $d$, on one end. The other end $e$ is threaded. A washer, D, is then placed over the threaded end, and the threaded nut E is tightly drawn up against the washer. F are the round holes, and G the round bolts with heads $f$, threads $g$, washers $h$ and $i$, and nuts $k$.

Having thus described my invention, I desire to claim—

The tapered square keys C C, with heads $d$, threaded end $e$, washer D, nut E, and square holes $c\ c$, in combination with the rail parts A and B, substantially as and for the purpose hereinbefore set forth.

WILLIAM R. CLARK.

Witnesses:
MATHIAS E. RIEGEL,
AARON CLARK.